United States Patent [19]

Allen et al.

[11] Patent Number: 5,371,760

[45] Date of Patent: Dec. 6, 1994

[54] METHOD AND APPARATUS FOR MEASURING THE IMPULSE RESPONSE OF A RADIO CHANNEL

[75] Inventors: Kenneth C. Allen, Boulder, Colo.; William A. Lindsay-Stewart, Walnut Creek, Calif.

[73] Assignees: Telesis Technologies Laboratory, Walnut Creek, Calif.; The United States of America as represented by the Secretary of Commerce, Washington, D.C.

[21] Appl. No.: 54,676

[22] Filed: Apr. 28, 1993

[51] Int. Cl.⁵ .............................. H04L 27/30
[52] U.S. Cl. .............................. 375/1; 380/34; 375/12; 375/14; 375/34; 455/67.1; 455/67.4; 455/67.6
[58] Field of Search ............... 375/1, 34, 11–16; 380/2, 34; 455/67.1, 67.3–67.7

[56] References Cited

U.S. PATENT DOCUMENTS

| | | | |
|---|---|---|---|
| 3,573,624 | 4/1971 | Hartmann et al. | 375/12 |
| 3,614,623 | 10/1971 | McAuliffe | 375/14 |
| 3,659,229 | 4/1972 | Milton | 333/18 |
| 3,694,643 | 9/1972 | Smith | 364/553 |
| 4,441,192 | 4/1984 | Kita et al. | 375/14 |
| 5,047,859 | 9/1991 | Koo | 348/614 |

OTHER PUBLICATIONS

Rudolf Werner Lorenz, "Outdoor Wideband Mobile-Radio Propagation Studies in Europe", IEICE TRANS. COMMUN., vol. E76–B, No. 2, Feb. 1993, pp. 65–77.

S. Hermann, U. Martin, R. Reng, H. W. Schuessler, K. Schwarz, "High Resolution Channel Measurement for Mobile Radio," *Conf. Proceedings EUSIPCO 90*, Barcelona, pp. 1903–1906.

Primary Examiner—Bernarr E. Gregory
Attorney, Agent, or Firm—Merchant, Gould, Smith, Edell, Welter & Schmidt

[57] ABSTRACT

A system for measuring a multipath radio channel impulse response by cross-correlating digital samples of a received pseudo-random signal with a digital copy of the transmitted signal. A transmitter within the system repeatedly transmits the pseudo-random signal across a multipath radio channel. A receiver within the system receives the transmitted signal, as well as delayed versions of the original signal, and digitally samples the received signals. A computer then cross-correlates the samples of the received signal with the digital stored version of the transmitted signal to produce a measure of the impulse response of the multipath radio channel.

17 Claims, 5 Drawing Sheets

METHOD AND APPARATUS FOR MEASURING THE IMPULSE RESPONSE OF A RADIO CHANNEL

The invention was made under a cooperative research and development agreement with the Institute for Telecommunications Sciences of the U.S. National Telecommunications and Information Administration. The Government has certain rights in the invention.

BACKGROUND OF THE INVENTION

1. Field of the Invention.

The present invention relates generally to a method and apparatus for measuring the impulse response of a radio channel, and more specifically, to a digital impulse response probe.

2. Description of Related Art.

Determining the impulse response of a radio channel typically involves correlation techniques. In the traditional pseudo-random noise (PN) probe approach to measuring the impulse response of a radio channel, a maximal length linear shift register generates a pseudo-random noise (PN) code, which is then transmitted repeatedly. The auto-correlation of the PN code is a triangular pulse with a base width of two bit durations. This triangular pulse is the band limited estimate of an ideal impulse. At the receiver, a copy of the transmitted PN code is cross-correlated with the PN code. Since the transmitted (and received) signal is repetitive, the cross-correlation is circular. Therefore, in the impulse response measurement, the delay times of the multipath signals are reduced "modulo" the duration time of the PN code. When multipath transmissions occur on the radio channel, temporal shifts, i.e., delays, occur in the PN codes. These delayed PN codes result in multiple triangular pulses in the cross-correlation. Thus, the cross-correlation is a band-limited estimate of the impulse response of the radio channel.

In traditional implementations, analog signal processing performs the cross-correlation using a sliding correlator method. In this method, a mixer multiplies the received signal and a duplicate of the transmitted signal. A low pass filter or bandpass filter integrates the output of the mixer. The relative delay of the two signals is provided by offsetting the clock rates of the received signal and the duplicate PN code. As the relative delay slips, the impulse response measurement appears at the output of the filter. Some implementations shift the relative delay by occasionally dropping a bit from the duplicate PN code. In either approach, the impulse response is measured sequentially at one delay time after another during the time required for the relative delay to slip through the PN code duration time.

SUMMARY OF THE INVENTION

To overcome the limitations in the prior art described above, and to overcome other limitations that will become apparent upon reading and understanding the present specification, the present invention discloses a method and apparatus for deriving the impulse response by taking discrete samples of the intermediate frequency (IF) at the receiver and processing the samples using digital signal processing techniques to provide improved results.

It is a principal object of the present invention to provide a method and apparatus for measuring the impulse response of the radio channel.

Another object of the present invention is to provide a method and apparatus for measuring the radio channel impulse response which allows a measurement to be made in a very short time period, thereby allowing the measurement of rapidly varying channels.

Another object of the present invention is to provide a method and apparatus for measuring the radio channel impulse response which is flexible and capable of processing higher bandwidth signals.

Another object of the present invention is to provide a method and apparatus for measuring the radio channel impulse response which allows much of the receiver to be implemented in software rather than hardware.

Another object of the present invention is to provide a method and apparatus for measuring the radio channel impulse response which allows imperfections in equipment to be corrected by processing the samples.

Another object of the present invention is to provide a method and apparatus for measuring the radio channel impulse response which allows raw data to be saved for post processing thus allowing for very rapid repetition of measurements.

Another object of the present invention is to provide a method and apparatus for measuring the radio channel impulse response which allows impulse responses from several transmitters with different PN words to be derived simultaneously from the same data sample.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
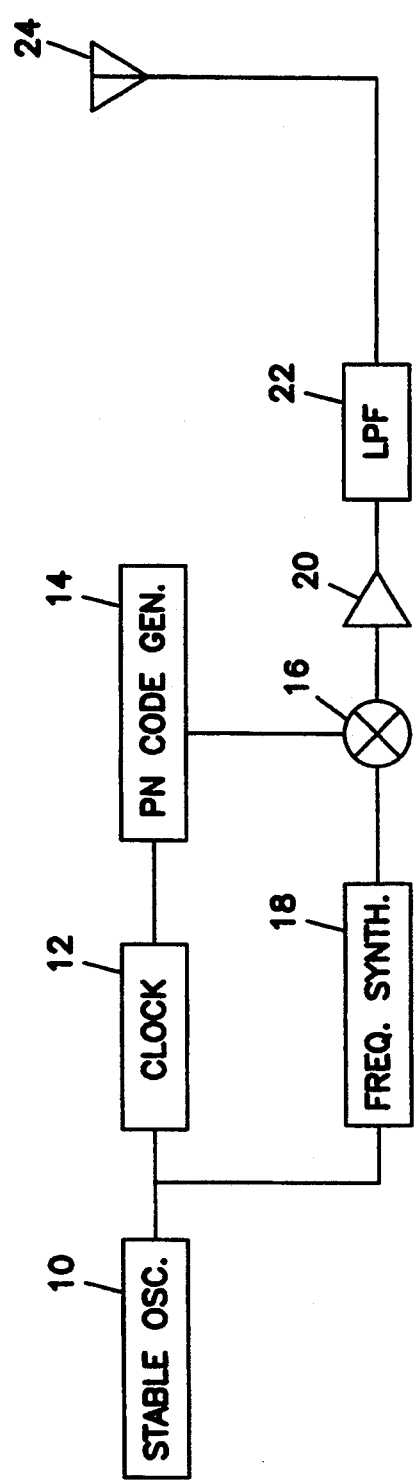
FIGS. 1 and 2 are block diagrams generally describing a transmitter and a receiver, respectively, used in an impulse response measurement system.

In the following detailed description of the preferred embodiments, reference is made to the accompanying drawings which form a part hereof, and in which is shown by way of illustration, embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is to be defined by the appended claims.

OVERVIEW

A multipath radio channel results from transmitted radio signals traveling by different paths to reach a receiver. These paths are determined by the location of the transmitter with respect to the receiver, the frequency of transmission, and the surrounding environment which may cause reflection, diffraction or scattering of the transmitted signal. For example, a transmitted signal may travel by a first direct path to a receiver, and may also travel by a second indirect path to the receiver. The first path may be direct because it is a "line of sight" path; the second path may be indirect because the transmitted signal is reflected off structures such as buildings. Since the second path is longer than the first path, the transmitted signal arrives at the receiver at two different moments in time. The receiver not only receives the original transmitted signal, but also receives delayed, and likely distorted, versions of the original signal. These delayed versions of the original signal therefore arrive at the receiver from different directions with different time delays, and they combine vectorially at the receiver antenna to give a resultant signal that can be large or small depending upon whether the incoming signals combine constructively or destructively. These signal fluctuations are commonly known as fading. It is also worth noting that whenever relative motion exists, there is a Doppler shift in the received signal, which is a manifestation in the frequency domain of the envelope fading in the time domain. Such multipath characteristics can have a profound impact on radio system performance and therefore indicate the importance of measuring the impulse response of the radio channel.

The present invention discloses a novel method and apparatus for determining the radio channel impulse response. The radio channel impulse response may be measured, according to an exemplary method, by: (a) generating a pseudo-random signal; (b) transmitting the signal; (c) receiving the signal; (d) digitally sampling the received signal; and (e) cross-correlating the digitally sampled received signal with a digitally sampled copy of the transmitted signal, so that a band limited measurement of the radio channel impulse response may be deduced. In the implementation proposed in the present invention, the cross-correlation is found using digital signal processing techniques. By sampling the intermediate frequency (IF), instead of mixing it down to co- and quadrature-phase baseband channels, less radio frequency hardware is used and the sensitive adjustment of the equipment is avoided.

The present invention allows measurements of the radio channel impulse response to be made in a very short time period, so that the impulse response of rapidly varying channels can be accurately determined. In addition, raw data can be saved for post-measurement processing, thereby allowing for the rapid repetition of such measurements. The present invention is also more flexible and capable of processing higher bandwidth signals. Moreover, much of the receiver can be implemented in software rather than hardware, and imperfections in the equipment can be corrected by processing the samples. Finally, the impulse responses from several transmitters with different pseudorandom noise (PN) words can be derived simultaneously from the same data sample.

GENERAL DESCRIPTION

Figure 2:
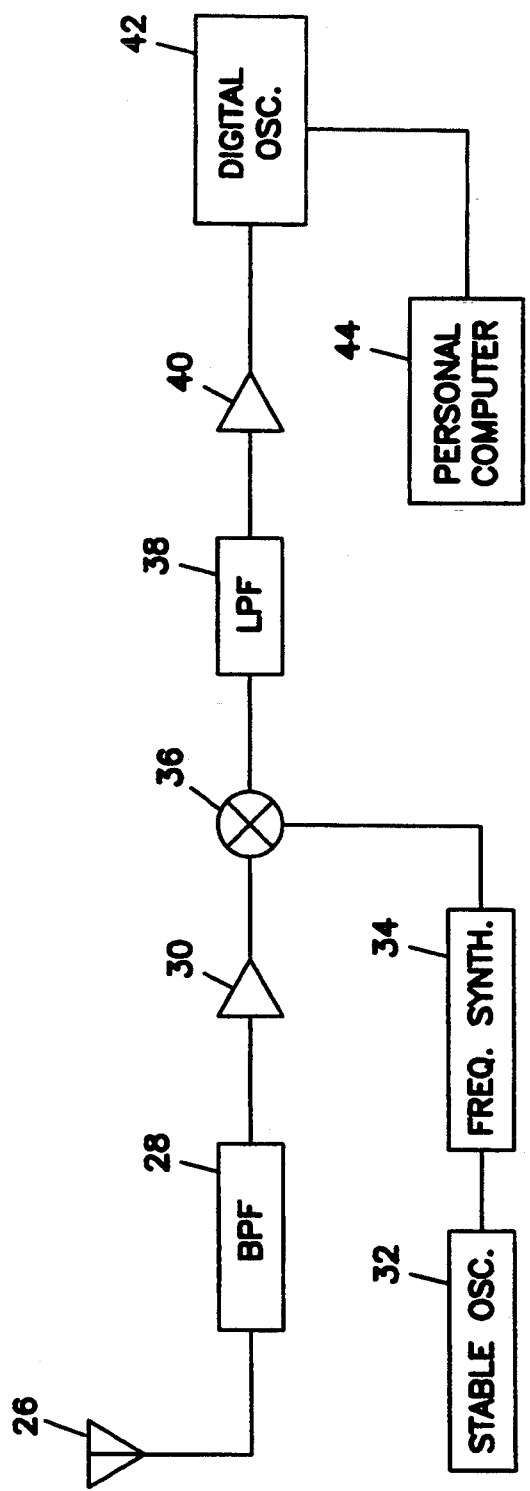

FIGS. 1 and 2 are block diagrams generally describing a transmitter and receiver, respectively, used in an impulse response measurement system according to the present invention.

Referring to FIG. 1, the transmitter is comprised of a stable oscillator 10, clock circuit 12, pseudo-random noise (PN) generator 14, mixer 16, frequency synthesizer 18, power amplifier 20, low pass filter 22, and antenna 24.

The stable oscillator 10 generates a signal for use by the clock circuit 12. The clock circuit 12 functions to generate a clock signal which is input to the PN generator 14. The PN generator 14 generates a PN word using a maximal length, linear feedback shift register (not shown).

The PN words are $2^n - 1$ bits long, where n is the number of registers. In the exemplary embodiment described in the present specification, $n=9$ and the PN word length is 511. Every bit sequence of length n may occur in the PN word, except for the case where every bit is zero; the longest run of zeros is $n-1$ in length. The auto-correlation of the PN word is a triangular pulse of height $2^n - 1$ and basewidth of two bit durations centered at zero delay time. At other delays, the value of the auto-correlation is $-1$. The maximum delay spread that can be observed is equal to the duration or the length of the PN word; any longer delay is reduced "modulo" the word duration.

The PN generator 14 outputs the PN word to the mixer 16 for mixing with a signal from the synthesizer 18. Both the clock circuit 12 and the synthesizer 18 are phase coherent, deriving their reference frequencies from the same stable oscillator 10. The signal output from mixer 16 is amplified by the power amplifier 20 and filtered to remove any high order harmonics by the low pass filter 22. The output signal from the low pass filter 22 is radiated by the antenna 24.

The signal bandwidth depends on the bit rate and modulation type. To avoid complications at the receiver in the determination of the co- and quadrature-phase parts of the impulse response, it is necessary to use real valued modulation, i.e., either amplitude or bi-phase modulation. Although it is possible to us a complicated amplitude modulated waveform, it was implicitly assumed above that the modulation would be binary and therefore on-off keying. Bi-phase modulation has the advantage that for the same transmitter power, the received S/N is 3 dB higher than on-off keying, since the transmitter is on twice as long. Therefore, bi-phase modulation is used.

The spectrum for bi-phase modulation is shaped like the sinc function, i.e., (sin x)/x. This spectrum is usually bandpass filtered to include only the energy out to the first null so that the total bandwidth is twice the bit rate. This filtering shapes the bit stream and therefore the resulting impulse measurement. Some care should be taken that the filter response does not result in high sidelobes about the impulse. These can mask or be mistaken for multipath effects.

The bandwidth of the system and the length of the PN word determine the pertinent parameters of the system. The 3 dB resolution of the impulse response measurement is equal to 1/(bit rate) and the maximum measurable delay is given by the word length multiplied by 1/(bit rate).

Referring to FIG. 2, the receiver is comprised of an antenna 26, bandpass filter 28, amplifier 30, stable oscillator 32, frequency synthesizer 34, mixer 36, low pass filter 38, amplifier 40, digital sampling oscillator 42, and personal computer 44.

The transmitted signal is received at the receiver by the antenna 26. The signal is first amplified (30) and filtered (28), and then subsequently mixed down to a suitable IF. The bandpass filter 28 offers some discrimination of the wanted signal from others in the local environment and the amplifier 30 is included to improve the sensitivity of the receiver.

It is conceivable that down sampling can be used to move the IF spectrum to the band between zero and the Nyquist frequency (equal to one half the sampling rate). The sampling rate must be at least twice the signal bandwidth to avoid distortion, but can be less than the carrier frequency or channel bandwidth. Down sampling is used to fold the spectrum from higher frequencies to below the Nyquist frequency. Down sampling is very similar to analog mixing, although discrete spectra repeat in the frequency domain. Because of the limited frequency response of the input circuitry of most commercially available analog-to-digital (A/D) converters, down sampling is not really practical and thus is not used in this embodiment. Ignoring the possibility of down sampling for now, it is necessary to sample at a rate greater than or equal to twice the highest frequency in the pass band of the signal. This is known as the Nyquist criterion.

The center frequency of the IF signal must be greater than or equal to one half the bandwidth of the received signal to prevent distortion by the folding of the spectrum around zero. An IF equal to one half the bandwidth of the signal allows the lowest digitizing sampling rate. A spectrum analyzer can be used to convert the received signal to an intermediate frequency.

The received signal can be mixed at the mixer 36 with a reference signal from the frequency synthesizer 34 to generate the IF signal, which is then filtered by the low pass filter 38 to remove any harmonics or intermodulation and passed through the amplifier 40 to boost the signal level of the final IF signal to an acceptable level for the digital sampling oscilloscope 42.

The digital sampling oscilloscope 42 digitizes the IF signal at a sampling rate that is at least twice the highest frequency in the bandpass. A sampling rate satisfying the Nyquist criterion should be used. As long as the Nyquist criterion is met, no information is lost during sampling, and it is possible to reconstruct the original waveform, except for end effects that can introduce errors. However, the end effects are easily dealt with by making the sampled waveform longer than the length of the desired sample. Thus, in some sense, the actual sampling rate is not important if the Nyquist criterion is met, since any desired rate can be generated by reconstructing the original waveform. However, to avoid this additional processing of the data, it is desirable to sample at an appropriate rate in the first place.

A number of IF center frequency and sampling rate combinations were examined experimentally. The best signal-to-noise ratio (S/N) resulted when the IF center frequency equalled the bit rate, as discussed above, and the sampling rate equalled four times the bit rate, or four samples per bit. This sampling rate results in 4 $(2^n-1)$ samples per PN word, e.g., 2044 samples for a 511 word length sequence. Since a Discrete Fourier Transform (DFT) is used to compute the impulse response, as discussed in more detail below, it would seem desirable to have the number of samples equal to a power of two, e.g., 2048, so that a radix-2 Fast Fourier Transform (FFT) can be used. However, when the sampling rate is increased slightly to result in 2048 samples per PN word, the signal-to-noise ratio (S/N) in the measured impulse response is reduced. It may be that the decrease in the signal-to-noise ratio (S/N) can be improved by better filtering of the IF. Nonetheless, in this embodiment, the sampling rate is four times the bit rate.

The digital sampling oscilloscope 42 relays the sampled signal to the computer 44. The computer 44 also includes a stored version of the originally transmitted PN word. The computer 44 then measures the impulse response by cross-correlating the digitized received signal with the stored version of the transmitted PN word. The cross-correlation is circular since the PN word is repeated.

Although it is possible to implement a discrete impulse response probe in which the pseudo-random signal has pauses in it and is not repetitive, the implementation of the present invention uses the continuous repetition of the PN word. This seems the natural way to implement a discrete probe, since the time sequence in a Discrete Fourier Transfer (DFT) pair is repetitive.

The natural way to compute the cross-correlation is to use the convolution property of the DFT pair. That is, convolution in the time domain is equivalent to multiplication in the frequency domain. Furthermore, since cross-correlation is equivalent to convolution of the first function with the time reversed version of the second function, the cross-correlation is found by multiplying the DFT of the first function by the complex conjugate of the DFT of the second function and taking the inverse DFT of the product.

This is accomplished by first computing a reference or duplicate of the transmitted PN word to be used to compute the cross-correlation. This reference consists of the $2(2^n-1)$ sample values (1 or $-1$) that would result, if an ideal version of the PN word (baseband) was sampled at twice the bit rate. Thus, a bit value of 1 results in two samples equal to 1 and a bit value of $-1$ results in two samples equal to $-1$. The DFT of the reference is computed and the complex conjugate taken. This is the reference baseband spectrum (complex conjugate) of the PN word that will be used to compute the impulse response.

Each time a measurement of the impulse response is desired, the IF signal is sampled as described above resulting in N=2044 samples for a 511 word length sequence. The DFT, F(n), n=0, 1, ..., N/2, of these digital samples is computed. This DFT represents an estimate of the IF spectrum. The co- and quadrature-phase spectra, $F_c(n)$ and $F_q(n)$, are determined from equations [1] and [2] below:

$$F_c(n) = F(n_{if}+n) + F^*(n_{if}-n) \qquad [1]$$

$$F_q(n) = jF(n_{if}+n) - jF^*(n_{if}-n) \qquad [2]$$

for n=0, 1, ..., N/4, where j equals the square root of minus one, nil is the bin number in the DFT corresponding to the center frequency of the IF signal, N is the total number of samples of the received signal, and F* represents the complex conjugate. The center frequency of the IF signal is at $n_{if}=N/4$. The above formulae are equivalent to mixing the received signal with cosine and sine waves with frequencies equal to the IF center frequency. The real valued inverse DFT of the co- and quadrature-phase spectra give the co- and quadrature-phase baseband signals.

Each co- and quadrature-phase spectra is multiplied by the complex conjugate reference baseband spectrum. The real valued inverse DFT of these products gives the co- and quadrature-phase parts of the impulse response. The total impulse response is the sum of the squares of the co- and quadrature phase parts. Thus, as an example, using a 511 word length sequence clocked at 10 MHz, the measured impulse response is made up on N/2=1022 digital values covering a total delay-time range of 51.1 microseconds. The time delay between values in this example would be 50 nanoseconds, so that there are four values across the base of a signal impulse.

In order to provide more values and therefore smooth the appearance of the measured impulse response, values can be interpolated. This is accomplished by adding values equal to zero onto the co- and quadrature-phase spectra before taking the inverse DFT. For example, 511 zeros are added so that the maximum frequency of the spectra is 20 MHz instead of 10 MHz. Then, the measured impulse response is made up on N=2044 digital values covering the same total delay-time range of 51.1 microseconds. The time delay between values is now 25 nanoseconds, so that there are eight values across the base of a single impulse.

If the digital samples of the IF at the receiver are not synchronized with the transmitted PN word, the samples may start in one word and end at the same point in the next word. This relative delay between the received PN word and the sampling interval results in the cyclical rotation of the PN word through the sample interval. The impulse response is also rotated within its $2(2^n-1)$ computed values. Therefore, in practice, after the measured impulse response is computed, it is rotated to a desired position, e.g., where the peak value of the impulse response occurs near the beginning of the $2(2^n1)$ computed values.

The length of the PN word limits the maximum S/N possible in the measured impulse response. Since the auto correlation of the PN word has a peak of $2^n-1$ and a value of $-1$ elsewhere, the maximum impulse height above the noise floor in decibels is $20 \log (2^n-1)$ or about 54 dB (assuming a 511 word length sequence). It should be noted that the maximum S/N in the co- and quadrature phase parts of the impulse response is only 27 dB (assuming a 511 word length sequence) or $10 \log (2^n-1)$. This limit is due to self interference and is called the correlation noise. The correlation noise level is proportional to the signal level. Its value relative to the signal level would be expected to be no better than the ideal given above.

Although the correlation noise limits the maximum S/N in the measured impulse response, other sources of noise such as thermal noise $N_t$ and quantization noise $N_q$ due to the digital sampling, determine the impulse response S/N in practice. When the signal level is strong, the thermal noise is less than the quantization noise. In this case, the quantization noise determines the S/N in the measured impulse response. The quantization noise can be estimated as equal to the minimum quantization step. For an m-bit quantizer (A/D converter), the quantization noise is 20 log (m) down from full scale. In the test measurement system, an 8-bit digital sampling oscilloscope is used so that the quantization noise is 48 dB down from full scale. Thus, if the signal level is within 10 dB of full scale, then the $S/N_q$ in the IF is at least 38 db. In computing the cross-correlation, a processing gain of $10 \log (2^n-1)$ or 27 dB is realized. Thus, the S/N in the measured impulse response is 27 dB greater than the S/N in the IF. Therefore, if a $S/N_q$ level of 27 dB can be maintained in the IF for a strong signal, the maximum S/N of 54 dB is realizable in the measured impulse response. This is easily done with an 8-bit A/D by adjusting the receiver gain (or the scale of the digital sampling oscilloscope), and is very practical even for a 6-bit A/D.

When the signal level is weak, the receiver gain should be such that the amplified thermal noise is greater than the quantization level and therefore the quantization noise. The thermal noise level in the IF must be high enough to cause the A/D to digitize at various quantization levels in the absence of a signal. Otherwise, the A/D output may not change and there would be no information to process. Again, because of the processing gain, the S/N in the measured impulse response will be 27 dB higher than the $S/N_t$ in the IF.

Thus, in practice, the S/N in the measured impulse response is near the maximum value of 54 dB for strong signals. For weaker signals, the S/N in the measured impulse response is 27 dB higher than the $S/N_t$ in the IF, i.e., the S/N in the measured impulse response is limited by thermal noise.

It should be noted that better S/N in the measured impulse response is possible if the sampling interval is longer than one PN word length. However, it is also possible to use a longer PN word to improve the S/N.

TEST MEASUREMENT SYSTEM

Figure 3:
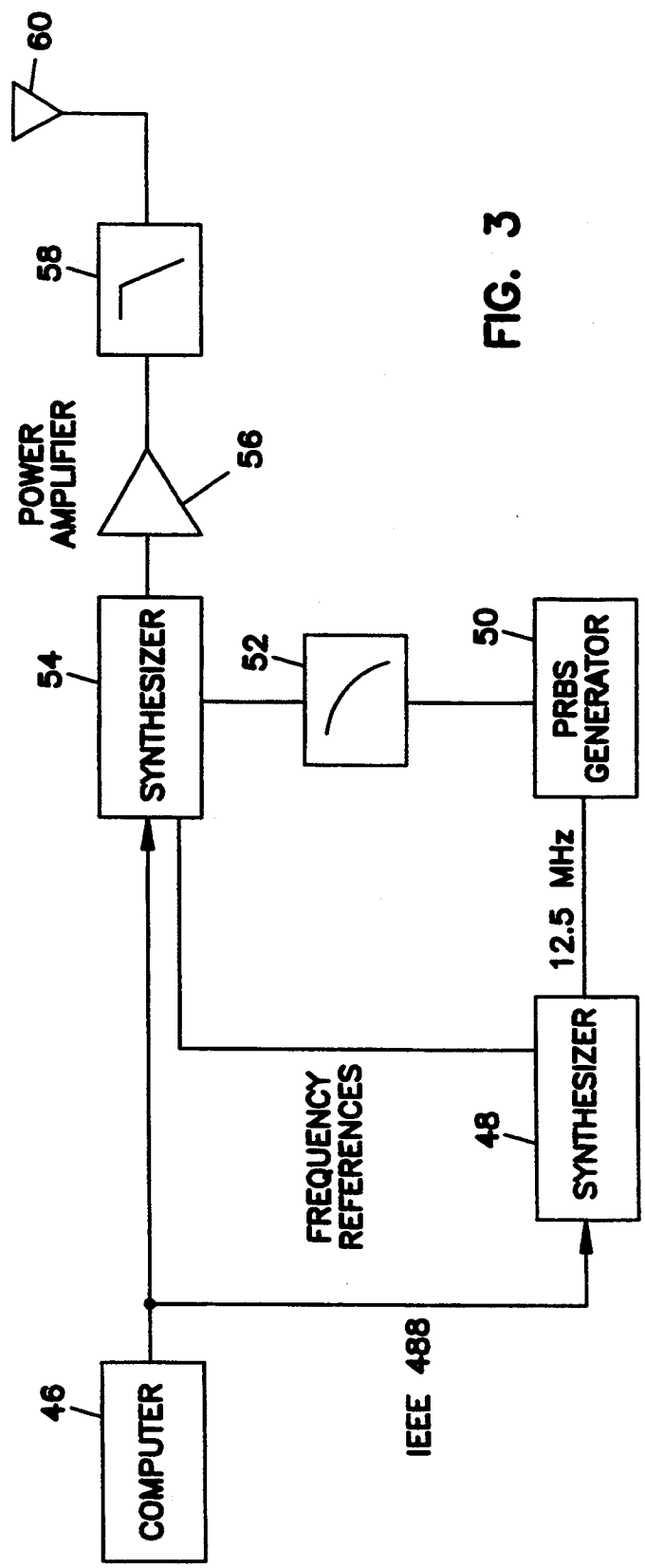
FIGS. 3 and 4 are block diagrams of a transmitter and a receiver, respectively, used in an exemplary test measurement system.
Figure 4:
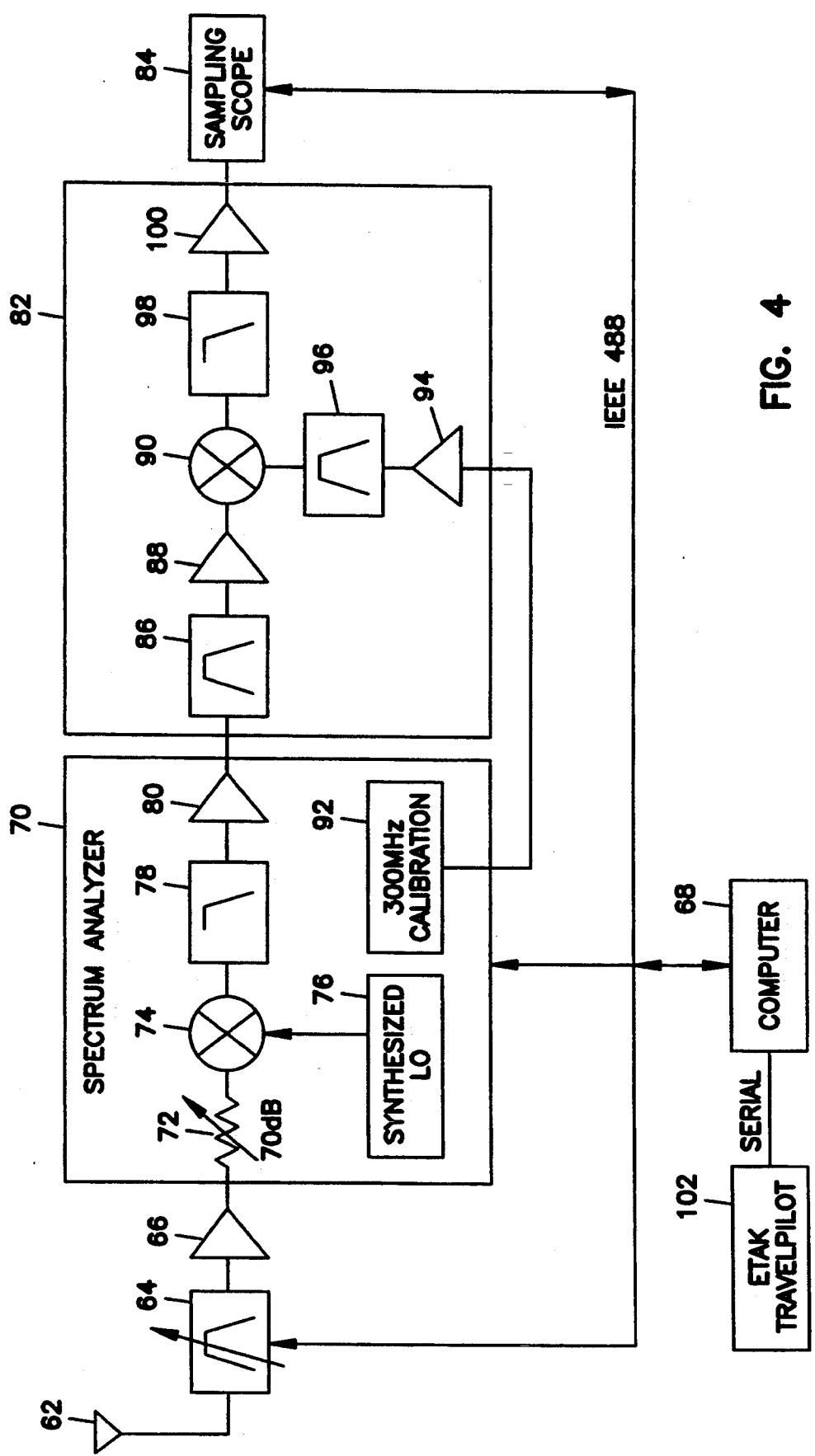

FIGS. 3 and 4 are block diagrams of a transmitter and receiver, respectively, used in an exemplary test measurement system according to the present invention. Elements of this embodiment have not been chosen to reduce component cost or the number of elements as compared with the general description of the measurement system described above, but rather, to prove the principles of the present invention while having the benefit of employing readily available off-the-shelf equipment.

Referring to FIG. 3, a computer 46 provides overall control functions for the elements of the transmitter. A synthesizer 48 functions to generate a 12.5 MHz clock signal for a Pseudo-Random Bit Sequence (PRBS) generator 50. In this embodiment, a clock signal (and final IF) of 12.5 MHz was chosen, because of the fixed sampling rates of the digital sampling oscilloscope (a Hewlett Packard Model 4112D).

The PRBS generator 50 generates a PN word of 511 bits, which is then filtered by a Gaussian filter 52. The Gaussian filter 52 shapes the PN word, thereby constraining the bandwidth of the signal. A Gaussian characteristic was chosen as it offered enough attenuation, in combination with the final low pass filter of the receiver, while achieving a relatively flat group delay characteristic across the passband. The Gaussian filter 52 outputs the filtered PN word to a synthesizer 54. The synthesizer 54 modulates the PN word onto a carrier signal using Binary Phase Shift Keying. The reference frequency source of synthesizer 48 acts as a stable oscillator from which the synthesizer 54 derives its reference clock.

The modulated signal from the synthesizer 54 is amplified by a power amplifier 56 and filtered to remove any high order harmonics by a low pass filter 58. The output signal from the low pass filter 58 is subsequently radiated by an antenna 60.

Referring to FIG. 4, the transmitted signal is received by an antenna 62 and passed through a tunable bandpass filter 64 (preferably a Telonic filter with 500-2000 MHz response) and low noise amplifier 66 to a spectrum analyzer 70. The filter 64, which has a 10% bandwidth, is controlled by computer 68, so that desired band of the received signal in the frequency range 500 to 2000 MHz can be selected. The purpose of this preselection is to lower the high noise figure of the spectrum analyzer 70 and thereby achieve greater receiver sensitivity.

The receiver uses the spectrum analyzer 70 (preferably an HP 8561B spectrum analyzer) to down convert the received signal to an intermediate frequency of 310.7 MHz for the next stage. Those general elements that the spectrum analyzer 70 uses for the down conversion include an attenuator 72, mixer 74, low pass filter 78, and amplifier 80. The 70 dB attenuator 72 is controlled by the computer 68, as described further below, to add or remove attenuation to the received signal. The mixer 74 mixes the output signal from the attenuator 72 with an internal (to the spectrum analyzer 70) synthesized local oscillator 76. The computer 68 is able to tune the spectrum analyzer 70 anywhere in the band covered by the tunable front end filter, e.g., 500 to 2000 MHz . The resulting IF signal, centered at 310.7 MHz , is then filtered by the low pass filter 78 to remove any harmonics or intermodulation products, and then amplified at 80 for module 82.

The module 82 further converts the IF signal centered at 310.7 MHz to a usable IF signal centered at 12.5 MHz for a digital sampling oscilloscope 84. For convenience, the 300 MHz calibration signal 92 from the spectrum analyzer 70 is used as a fixed local oscillator for mixer 90. Using this source requires that the center frequency of the spectrum analyzer 70 be offset from that of the transmitted signal so that the final IF falls at 12.5 MHz . In this exemplary embodiment, an offset of 1.8 MHz is used. Some preconditioning of the 310.7 MHz IF signal is done using filter 86 (having a 10% bandwidth centered at 310.7 MHz ) and amplifier 88. Amplifier 94 amplifies the local oscillator signal to a suitable signal level of +10 dB m for mixer 90, while filter 96 removes the harmonics of the signal.

The 12.5 MHz final IF from the mixer 90 is passed through a low pass Gaussian filter 98 to remove the unwanted intermodulation products of the mixing process. In conjunction with the transmitter's shaping filter 58, the attenuation of frequencies beyond half the sampling frequency is greater than 50 dB , which is in excess of the dynamic range of the 8-bit A/D converter in the digital sampling oscilloscope 84. Suitable amplification is introduced into the IF chains by an amplifier 100 to raise the signal level to match the sensitivity range of the digital sampling oscilloscope 84.

The sampling scope 84 digitizes the IF signal at a sampling rate of 50 megasamples per second (i.e., 50 MHz ), obtaining a total of 2044 samples for each 511 bit length sequence. The sampled data is then relayed to the computer 68. The computer 68 also includes a stored version of the original transmitted PN word. The computer 68 then cross-correlates the digitized received signal with the stored version of the transmitted PN word, as described above.

In the test measurement system, the computer 68 controls the elements of the receiver via a General Purpose Interface Bus (GPIB), so that correct settings are repeatedly made on the controlled elements.

Automatic gain control is used to increase the dynamic range of the receiver. For example, the computer 68 senses the level of the IF signal received by the digital sampling oscilloscope 84, and automatically adjusts the scaling of the oscilloscope 84 to make use of the dynamic range of its A/D converter. Further, the computer 68 is able to control the attenuator 72 in the spectrum analyzer 70 for further dynamic range control, by either adding or removing attenuation in the received signal.

The computer 68 may be coupled to an ETAK travel pilot 102, which provides approximate position information for the receiver. The ETAK 102 is a "dead reckoning" navigational system with an accuracy to within 100 meters, and has the ability to record parameters that can be downloaded to the computer 68. These parameters may include, for example, the latitude and longitude of the receiver's present position, as well as the distance traveled and instantaneous speed of a vehicle carrying the receiver. The ETAK 102 is used to tag the measured data recorded on the computer 68 with position, time, distance and speed values for later analysis.

Figure 5:
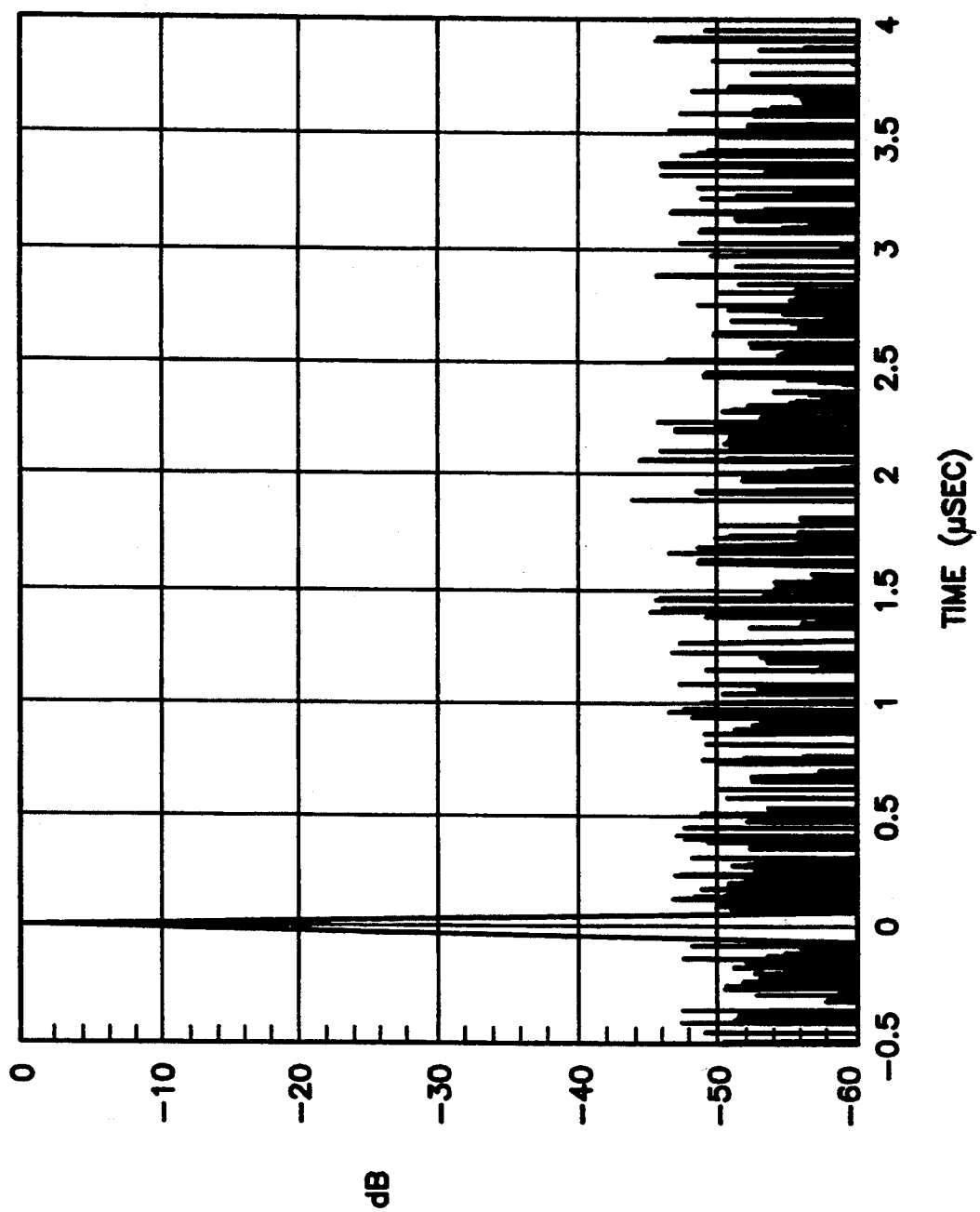
FIG. 5 is an illustration of a measured impulse response of the exemplary test measurement system with the transmitter and receiver back-to-back.

FIG. 5 illustrates a measured impulse response of the transmitter and receiver back-to-back showing the typical S/N performance of the test equipment. Imperfections in the equipment can be corrected when the transmitter and receiver are back-to-back since the ideal impulse response is known. This signal processing method is commonly known as deconvolution. Moreover, S/N values better than −50 dB of correlation noise relative to the peak impulse have been observed from the test system employing this additional processing. However, when the IF center frequency, bit rate, or sampling rate are mistuned in frequency with respect to each other, noticeable decreases in the S/N of the measured impulse response have been observed.

CONCLUSION

In conclusion, the present invention discloses a novel method and apparatus for determining the radio channel impulse response. The radio channel impulse response may be measured, according to an exemplary method, by: (a) generating a pseudo-random signal; (b) transmitting the signal; (c) receiving the signal; (d) digitally sampling the received signal; and (e) cross-correlating the digitally sampled received signal with a digitally sampled copy of the transmitted signal, so that a band limited measurement of the radio channel impulse response may be deduced. In the implementation proposed in the present invention, the cross-correlation is found using digital signal processing techniques. By sampling the IF, instead of mixing it down to co- and quadrature-phase baseband channels, less radio frequency hardware is used and the sensitive adjustment of the equipment is avoided.

While the present invention has been described in connection with exemplary embodiments thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A system for measuring an impulse response of a radio channel, comprising:
    (a) transmitter means for transmitting a pseudo-random signal across a radio channel;
    (b) receiver means for receiving the transmitted pseudo-random signal;
    (c) mixing means for down-converting the received pseudo-random signal to an intermediate frequency signal;
    (d) digital sampling means, coupled to the mixing means, for digitally sampling the intermediate frequency signal; and
    (e) processing means, coupled to the digital sampling means, for cross-correlating the digitally sampled intermediate frequency signal with a digital representation of the transmitted pseudo-random signal to determine the impulse response of the radio channel.

2. The system of claim 1, wherein the transmitter means further comprises means for continuously transmitting the pseudo-random signal.

3. The system of claim 1, wherein the transmitter means further comprises:
   (1) means for generating a pseudo-random digital word using at least one maximal length linear feedback shift register; and
   (2) means for converting the pseudo-random digital word into the pseudo-random signal.

4. The system of claim 3, wherein the pseudo-random digital word is $2^n - 1$ bits long where n is the number of the registers.

5. The system of claim 1, wherein the transmitter means comprises:
   (1) a Pseudo-Random Bit Sequence (PRBS) generator for generating a pseudo-random noise word (PN) signal;
   (2) means, coupled to the PRBS generator, for modulating the PN words onto a carrier signal to create the pseudo-random signal; and
   (3) an antenna, coupled to the means for modulating, for radiating the carrier signal.

6. The system of claim 1, wherein the processing means further comprises means for controlling the mixing means to select a desired band of the received pseudo-random signal.

7. The system of claim 1, wherein the processing means further comprises means for sensing a level of the digitally sampled intermediate frequency signal, and for controlling the mixing means to add and remove attenuation in the received pseudo-random signal, thereby providing dynamic range control for the receiver means.

8. The system of claim 1, wherein the processing means further comprises means for sensing a level of the digitally sampled intermediate frequency signal, and means for automatically adjusting the scaling of the digit sampling means in response to the sensed level.

9. The system of claim 1, further comprising navigational means, coupled to the processing means, for sensing an approximate position of the receiver means and for storing a latitude and longitude representation of the approximate position.

10. The system of claim 1, wherein:
    (1) the receiver means comprises means for receiving a delayed version of the transmitted pseudo-random signal; and
    (2) the processing means comprises means for calculating a delay time between reception by the receiver means of the transmitted pseudo-random signal and reception of the delayed version of the transmitted pseudo-random signal.

11. The system of claim 1, wherein the correlation means comprises:
    (1) means for calculating a first Fourier transform of the digitally sampled intermediate frequency signal;
    (2) means for calculating a second Fourier transform of the digital representation of the transmitted pseudo-random signal;
    (3) means for multiplying the first Fourier transform by a complex conjugate of the second Fourier transform; and
    (4) means for calculating an inverse Fourier transform of a result of the multiplication of the first and second Fourier transforms. Fourier transforms.

12. A method for measuring an impulse response of a radio channel, comprising the steps of:
    (a) transmitting a pseudo-random signal across a radio channel;
    (b) receiving the transmitted pseudo-random signal;
    (c) down-converting the received pseudo-random signal to an intermediate frequency signal;
    (d) digitally sampling the intermediate frequency signal; and
    (e) cross-correlation the digitally sampled intermediate frequency signal with a digital representation of the transmitted pseudo-random signal to determine the impulse response of the radio channel.

13. The method of claim 12, wherein the transmitting step further comprises the step of repeatedly transmitting the pseudo-random signal.

14. The method of claim 12, wherein the transmitting step further comprises the steps of:
    (1) generating a pseudo-random digital word using at least one maximal length linear feedback shift register; and
    (2) converting the pseudo-random digital word into the pseudo-random signal.

15. The method of claim 14, wherein the pseudo-random digital word is $2^n - 1$ bits long where n is the number of the registers.

16. The method of claim 12, wherein:
    (1) the receiving step further comprises the step of receiving a delayed version of the transmitted pseudo-random signal; and
    (2) the cross-correlating step further comprises the step of determining a delay time between reception of the transmitted pseudo-random signal and reception of the delayed version of the transmitted pseudo-random signal.

17. The method of claim 12, wherein the cross-correlating step comprises the steps of:
    (1) calculating a first Fourier transform of the digitally sampled intermediate frequency signal;
    (2) means for calculating a second Fourier transform of the digital representation of the transmitted pseudo-random signal;
    (3) multiplying the first Fourier transform by a complex conjugate of the second Fourier transform; and
    (4) calculating an inverse Fourier transform of a result of the multiplication of the first and second Fourier transforms.

* * * * *

UNITED STATES PATENT AND TRADEMARK OFFICE
CERTIFICATE OF CORRECTION

PATENT NO. : 5,371,760

DATED : December 6, 1994

INVENTOR(S) : Kenneth C. Allen, et al.

It is certified that error appears in the above-identified patent and that said Letters Patent is hereby corrected as shown below:

Column 4, line 32, "us" should read --use--.
Column 7, line 26, "2(2"1)" should read --2(2ⁿ-1)--.
Column 8, line 37, "4112D)" should read --54112D)--.
Column 9, line 30, "10 dB m" should read -- 10 dBm--.
Column 11, line 44, "digit" should read --digital--.
Column 12, line 12, after "Fournier transforms." strike "Fournier transforms." (second occurrence); and line 22, "cross-correlation" should read --cross-correlating--.

Signed and Sealed this

Thirtieth Day of May, 1995

Attest:

BRUCE LEHMAN

Attesting Officer

Commissioner of Patents and Trademarks